United States Patent [19]

Donaldson

[11] Patent Number: 4,536,362

[45] Date of Patent: Aug. 20, 1985

[54] METHOD FOR PRODUCING LONGITUDINALLY RIBBED PLASTIC FILM

[75] Inventor: Jack J. Donaldson, Rochester, N.Y.

[73] Assignee: Mobil Oil Corporation, New York, N.Y.

[21] Appl. No.: 539,600

[22] Filed: Oct. 6, 1983

[51] Int. Cl.³ .............................................. B29F 3/04
[52] U.S. Cl. ................................ 264/171; 156/244.11; 156/244.12; 264/177 R; 425/461; 425/462
[58] Field of Search ................... 264/177 R, 167, 108, 264/173; 425/461, 462; 156/244.11, 244.12

[56] References Cited

U.S. PATENT DOCUMENTS

| | | | |
|---|---|---|---|
| 3,281,897 | 11/1966 | Mercer | 264/209.2 |
| 3,420,924 | 1/1969 | Mason et al. | 264/108 |
| 3,549,735 | 12/1970 | Moss | 264/108 |
| 3,574,809 | 4/1971 | Fairbanks et al. | 264/177 R |
| 3,936,518 | 2/1976 | Soda et al. | 264/177 R |
| 4,083,914 | 4/1978 | Schippers et al. | 264/177 R |
| 4,101,620 | 7/1978 | Kops et al. | 264/177 R |
| 4,217,322 | 8/1980 | Sugano et al. | 425/461 |
| 4,322,202 | 3/1982 | Martinez | 425/461 |

FOREIGN PATENT DOCUMENTS

| | | | |
|---|---|---|---|
| 2406821 | 11/1974 | Fed. Rep. of Germany | 264/310 |
| 1563155 | 4/1969 | France | 264/177 R |
| 43-24560 | 10/1968 | Japan | 264/177 R |
| 53-33994 | 9/1978 | Japan | 425/461 |
| 54-124072 | 9/1979 | Japan | 264/177 R |

*Primary Examiner*—Jeffery Thurlow
*Attorney, Agent, or Firm*—Alexander J. McKillop; Michael G. Gilman; Charles J. Speciale

[57] ABSTRACT

A longitudinally ribbed plastic film is produced by extruding through a pair of die lips, at least one of which is provided with slots which run at an angle to the direction of resin flow across the die lips. Impurities in the resin tend to collect in the slots, and thus in the ribs of the film. This occurs because of the shear stress field created by the slots. A high melt viscosity component of a multi-layer coextrusion behaves in a fashion similar to the impurities and is substantially extruded in the ribs.

8 Claims, 8 Drawing Figures

METHOD FOR PRODUCING LONGITUDINALLY RIBBED PLASTIC FILM

BACKGROUND OF THE INVENTION

1. Field of the Invention

The present invention is directed to a longitudinally ribbed plastic film, and to a method and apparatus for producing this film. Such films are used, for example, in pallet wrapping, to prevent moisture and dust damage to the product carried on the pallet. More particularly, this invention is related to such a film which is formed by extrusion through a slot die. The invention is directed particularly to stretch films used for pallet wrapping.

2. Description of the Prior Art

Uniform thickness plastic films exhibit a tendency for puncture and tear propogation when such film is wrapped on a load under high tension. Also, impurities in the resin, such as gel particles, provide points of weakness in the film. To overcome this problem, relatively expensive "clarity" grade resins have been used. Another solution has been the use of tight screen packs and high shear mixing zones to prevent the appearance of gels at the die lip and during melt drawing. However, these steps are unsatisfactory because polymer and/or property degradation result.

SUMMARY OF THE INVENTION

It is an an object of this invention to provide a plastic film which is resistant to tears.

It is a further object of this invention to provide a film which is made from relatively inexpensive grade resins which are not affected adversely during the production of the film.

It is a further object of this invention to provide a method and apparatus for making a film having the properties outlined above.

The above objects and others are obtained by providing a plastic film having longitudinal ribs. The ribs form strengthened areas which hinder the propogation of tears and punctures. The film is formed by extruding the plastic through a pair of spaced die lips. One of the die lips is provided with slots which run at an angle to the direction of flow of resin across the die lips. This causes impurities in the resin, such as gel particles, to collect in the slots of the die lip and be extruded in the thickened, rib portion of the film. This reduces the deleterious effects of the impurities upon film performance.

DETAILED DESCRIPTION OF THE INVENTION

Figure 1:
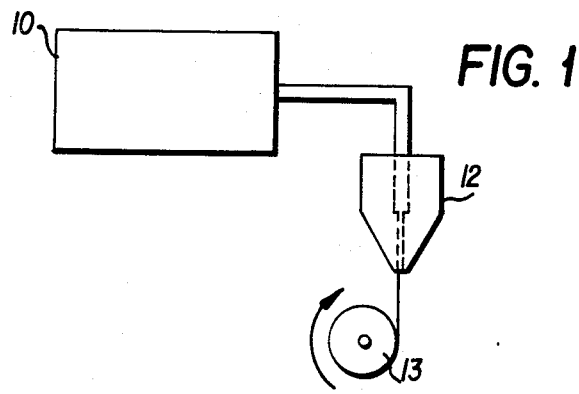
FIG. 1 shows a schematic diagram of the film extruding system of the present invention.

As can be seen in FIG. 1, the extrusion system of the present invention includes a reservoir 10 for holding molten resin to be extruded. Resin from the reservoir is supplied under pressure to an extrusion die 12, from which the extruded film is taken up by a conventional extruded film drawing mechanism 13 known in the art.

Figure 3:
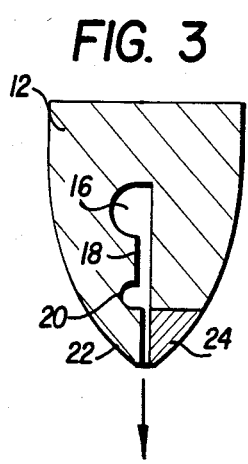
FIG. 3 shows a lateral cross section of the extruder die taken along line 3—3 of FIG. 2.
Figure 2:
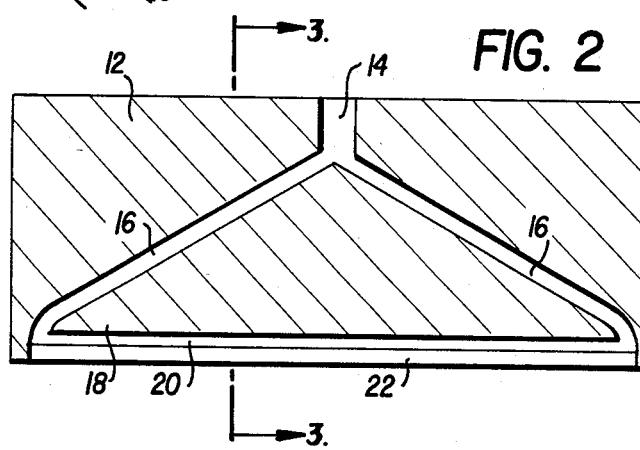
FIG. 2 shows a longitudinal cross section of the extruder die used in the present invention.

The extrusion die, as shown in FIGS. 2 and 3, may be one generally known in the art as a "coat hanger" die. It includes relatively deep peripheral channels 16, plateau 18 and a relatively shallow channel 20 adjacent die lips 22 and 24. This arrangement is used to supply molten resin to the die lips at a constant and even pressure.

Figure 4:
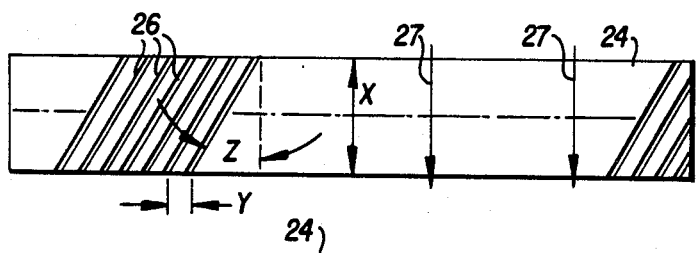
FIG. 4 shows a detail view of the slotted die lip of the extruder.

Referring to FIG. 4, die lip 24 is provided with a number of substantially parallel slots or grooves 26. Any known method of forming the slots, such as machining, is suitable. The direction of resin flow across the die lip is shown by the arrows 27 in FIG. 4. The drawing direction for the extruded film is substantially the same as the flow direction across the die lip. The slots may be part-circular in cross section, which makes the slots easy to form with a machining ball. Other configurations are suitable. It is desirable to use a smoothly contoured configuration, since sharp corners can lead to poor resin flow.

The slots 26 run at an angle to the direction of the resin flow. This arrangement creates a shear stress field during extrusion, which causes impurities in the resin, such as gel particles, to be collected by and retained in the slots. Consequently, the impurities are extruded in ribs 30 (FIG. 7) which are formed in the extruded film at a downstream end of the slots 26, the ribs extending in the direction of arrows 27. Thus, the impurities, which tend to weaken the film, are located in the extruded ribs which are the strongest part of the film.

The slots are disposed so that resin travelling in the flow direction 27 preferably passes across at least two slots. Thus, the angle between the slots and the flow direction is dependent upon the flow lengths of the die lip and the spacing of the ribs. As the flow length increases or the spacing decreases, the angle between the flow direction and the slots can decrease. On the other hand, as flow length decreases and spacing increases, the angle must increase.

Referring again to FIG. 4, X represents the length of the die lip 24 in the flow direction; Y represents the distance between slots 26; and Z represents the angle between the slots and the flow direction. It can be seen that the tangent of the minimum angle Z (still allowing for passage of resin across at least two slots) will equal Y divided by X. For practical reasons, the flow length X should be in the range of about ¼ inch to 2 inches, and the spacing Y should be about 1/16 inch to 4 inches. Thus, when the flow length is ¼ inch, the minimum angle ranges from about 14° to 86°, depending upon the spacing. When the flow length is 2 inches, the minimum angle ranges from about 2° to 64°, depending upon the spacing.

In a specific embodiment, a die lip was provided, having a flow length of about 1 inch and slots spaced about 0.866 inches apart. An angle of about 60° was employed. The slots were 0.015 inches deep, and were part-circular in cross section, with a radius of 0.0375 inches. The lips were 0.015 inches apart, and the die was about 45 inches wide.

Figure 5:
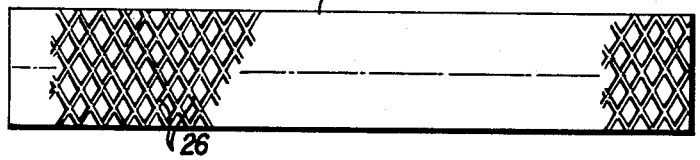
FIG. 5 shows a second embodiment of the slotted die lip.

FIG. 5 shows a second embodiment for the die lip 24. In this embodiment, the slots 26 run in two different directions intersect one another. That is, there are two sets of parallel slots, running in different directions and intersecting one another. Wider spacing between slots can be used with the two sets of slots. The two sets of slots are produced by first cutting one set of slots in the die face in a first direction and then cutting a second set of slots in a different second direction. The two sets of slots preferably are of equal depths. It can be seen that, as with FIG. 4, resin travelling in the flow direction 27 passes across at least two slots.

Figure 6:
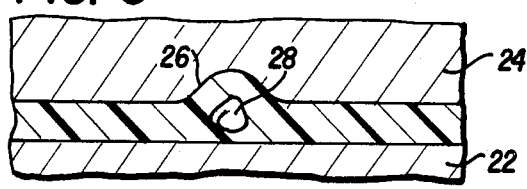
FIG. 6 shows an impurity particle carried in one of the slots of the die during extrusion.

FIG. 6 shows an impurity, such as a gel particle 28, which is captured by and carried in slots 26. Because of the shear stress field created by the slot, the impurity will tend to remain in the slot for the duration of its flow through die lips 22, 24. By placing the slots at an angle to the flow direction as described above, the chances of impurities entering the slots are increased.

Figure 7:
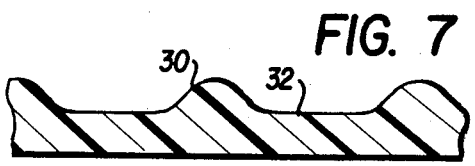
FIG. 7 shows a cross section of the film according to the present invention.

As can be seen in FIG. 7, the film produced has a non-uniform cross section, including ribs 30 and valleys 32. It is contemplated that virtually any thermoplastic resin could be used in this invention. Generally, when the extruded films are for pallet wrapping, the resins used can be a linear low density polyethylene, a high pressure low density polyethylene, polypropylene or an ethylene-vinyl acetate copolymer. However, linear low density polyethylene is preferred.

In addition to directing impurities 8 into ribbed portions 30 of an extruded film, die 12 and its associated slots can also be used with a multi-component laminar resin feed to preferentially direct one of the resins into the ribs of the extruded film. Thus, it has been discovered that a high-melt viscosity component of a coextruded film tends to behave like the impurities 28 with respect to the slots 26. Coextruded films allow the use of one resin to give desired surface characteristics while using the advantageous properties of another resin in the core. For example, a resin having high strength but poor surface characteristics may be used in the core, while a resin providing a smooth surface could be used for the surface layer. Also, resins could be selected to provide smooth and sticky sides for the film, or to provide different colors. For example, assume that A represents a low-melt viscosity resin and B represents a high-melt viscosity resin, with the ratio of melt viscosities being approximately 3 to 1 or greater. The B resin component will tend to remain in the slots and thus the ribbed portions of the film. Of course, there will be a relative reduction of the high-melt viscosity component in the area between the ribs. If an A-B-A resin laminar flow were conducted through die 12 in the relative amounts of 10% to 80% to 10% fed into the die 12, it is expected that a distribution of about 20% to 60% to 20% would be found in the area between the ribs of the extruded film, while the ribs themselves would have a 5% to 90% to 5% resin distribution. This can be seen in FIG. 8, where a high viscosity layer 36 is present in greater proportions relative to the other resin in the ribs than in the spaces between the ribs. Low viscosity layers 34 are present in greater proportions relative to the other resin in the spaces between the ribs than in the ribs. Similar effects are seen with a two-layer extrusion.

Figure 8:
FIG. 8 shows a multiple component film according to the present invention.

As is known in the art, there are several methods of forming coextruded films such as depicted in FIG. 8. In one method, several extruder dies are placed in close proximity the feed a common set of die lips, such as die lips 22, 24, thus forming the necessary laminar flow immediately upstream of the die lips. On the other hand, a single extrusion die may be used, with the laminar flow being formed through appropriate resin inlets upstream of the extrusion die inlet. The laminar flow is maintained during passage through the extrusion die (such as the illustrated coat hanger die) and the die lips 22, 24. By way of example, a core layer of nylon or polyester resins, which exhibit high strength, could be used with polyethylene resin surface layers. Since, as discussed above, the nylon or polyester will tend to migrate to the ribs of the extruded film, the strength of the ribs will be increased further.

It should be noted that the height and spacing of the ribs will be determined according to factors such as the desired use of the film and aesthetic qualities. Of course, the height of the ribs is related to the size of the slots, particularly the depth of the slots, as is well known to those skilled in the art. Although one die lip 24 has been shown with slots, the slots can be provided in the other die lip 22, or alternatively, both lips could be slotted to provide a film having two ribbed surfaces.

Although a detailed description of this invention has been set forth above, modifications will be apparent to those skilled in the art. Thus, the scope of this invention should not be considered as limited by the detailed description of the invention, but as set forth in the following claims.

I claim:

1. A process for extruding a plastic film, comprising: transporting molten resin to an extrusion die inlet;
   flowing said resin under pressure from said inlet to a narrow outlet, comprising two spaced, substantially planar lips, said resin flowing in a given direction across said lips, one of said lips being interrupted by a plurality of substantially parallel slots, said slots running at an angle to the given direction, and being spaced so that resin flowing in said given direction across said slotted die lip passes across at least one of said slots;
   drawing said extruded film from said outlet in a direction substantially the same as said given direction to produce an extruded film having ribs formed by said slots extending in the given direction.

2. The process of claim 1, wherein said slots are disposed at an angle of about 60° to said given direction.

3. The process of claim 1, further comprising collecting impurity particles in the slots, transporting said particles along said slots and extruding said particles in said ribs, substantially all of the impurity particles of the molten resin being collected in said slots.

4. The process of claim 1, wherein said slotted die lip has two intersecting sets of parallel slots, running in two different directions.

5. The process of claim 1, wherein two resins are coextruded as a laminar flow through said die lips, one of said resins having a melt viscosity at least about three times as great as that of the other resin, said higher viscosity resin being present in a relatively greater amount in said slots than in the space between said slots during its flow through said die lips.

6. The process of claim 1, wherein said slots run at an angle and are spaced so that said resin passes across at least two of said slots.

7. The process of claim 6, wherein said slotted die lip has a length of about ¼ inch in said given direction and said slots are at an angle of about 14° to 86° said given direction.

8. The process of claim 6, wherein said slotted die lip has a length not greater than about two inches and said slots are at an angle of at least about 2° to said given direction.

* * * * *